United States Patent
Wouters

(10) Patent No.: US 9,932,180 B2
(45) Date of Patent: Apr. 3, 2018

(54) TRAY STACK DISPENSER

(71) Applicant: Jarik B.V., Schijndel (NL)

(72) Inventor: Marinus Hendrikus Petrus Wouters, Schijndel (NL)

(73) Assignee: JARIK B.V., Schijndel (NL)

( * ) Notice: Subject to any disclaimer, the term of this patent is extended or adjusted under 35 U.S.C. 154(b) by 0 days.

(21) Appl. No.: 15/555,872

(22) PCT Filed: Mar. 4, 2016

(86) PCT No.: PCT/NL2016/050149
§ 371 (c)(1),
(2) Date: Sep. 5, 2017

(87) PCT Pub. No.: WO2016/144162
PCT Pub. Date: Sep. 15, 2016

(65) Prior Publication Data
US 2018/0057274 A1    Mar. 1, 2018

(30) Foreign Application Priority Data

Mar. 6, 2015 (NL) ...................................... 2014413

(51) Int. Cl.
| | |
|---|---|
| *B65G 11/02* | (2006.01) |
| *B65G 47/51* | (2006.01) |
| *B65G 59/10* | (2006.01) |
| *B65G 59/12* | (2006.01) |
| *B65G 41/00* | (2006.01) |
| *B65G 15/26* | (2006.01) |
(Continued)

(52) U.S. Cl.
CPC .......... *B65G 47/5113* (2013.01); *B65B 43/44* (2013.01); *B65B 43/52* (2013.01); *B65G 15/26* (2013.01); *B65G 41/003* (2013.01); *B65G 47/44* (2013.01); *B65G 59/108* (2013.01); *B65G 59/12* (2013.01); *B65G 2201/0258* (2013.01)

(58) Field of Classification Search
CPC ...... B65G 11/02; B65G 11/023; B65G 59/12; B65G 15/26; B65B 43/44; B65B 43/52
USPC ................................ 198/530, 535, 567, 568
See application file for complete search history.

(56) References Cited

U.S. PATENT DOCUMENTS

| | | | | |
|---|---|---|---|---|
| 1,783,806 | A | * | 12/1930 | Walther-Winfried .... H01K 3/28 198/418 |
| 2,796,711 | A | * | 6/1957 | Rich ....................... B65B 43/44 221/209 |

(Continued)

*Primary Examiner* — Joseph Dillon, Jr.
(74) *Attorney, Agent, or Firm* — Hoffman & Baron, LLP

(57) ABSTRACT

A packaging dispenser, for dispensing stacks of nested trays to a packing device, has a frame, a first conveyor for conveying and supporting a first plurality of stacks of nested trays in a first level, and a second conveyor downstream of the first conveyor for receiving stacks of nested trays from the first conveyor. The packaging dispenser also includes a vertical chute underneath the second conveyor for dispensing stacks of nested trays to a packing device. The second conveyor has a pair of laterally spaced conveyor elements for supporting only lateral edge regions of a stack of nested trays. The laterally spaced conveyor elements are retractable to allow a stack of nested trays, supported thereon, to be released into the chute. The packaging dispenser can further be provided with a tray separator upstream of the chute for loosening individual trays of a stack, while keeping the trays in a stacked and nested arrangement.

15 Claims, 6 Drawing Sheets

(51) Int. Cl.
*B65B 43/44* (2006.01)
*B65B 43/52* (2006.01)
*B65G 47/44* (2006.01)

(56) References Cited

U.S. PATENT DOCUMENTS

| | | | |
|---|---|---|---|
| 3,169,354 A | 2/1965 | Bliss et al. | |
| 3,313,433 A * | 4/1967 | Ragnar | B65G 59/062 198/443 |
| 3,341,072 A | 9/1967 | van der Schoot | |
| 3,478,924 A | 11/1969 | Comstock | |
| 3,593,860 A | 7/1971 | Brenner | |
| 3,903,676 A * | 9/1975 | Kinney | B65B 43/44 53/282 |
| 3,928,184 A | 12/1975 | Anschutz | |
| 4,026,425 A * | 5/1977 | Gruodis | B65G 47/44 193/2 R |
| 4,086,998 A | 5/1978 | van der Schoot | |
| 4,194,343 A * | 3/1980 | Myers | B65B 25/046 198/524 |
| 4,230,204 A * | 10/1980 | Langen | B65B 43/52 186/66 |
| 4,328,908 A | 5/1982 | Temming | |
| 4,383,613 A | 5/1983 | van Kettenbroek | |
| 4,529,101 A | 7/1985 | Orlowski | |
| 4,569,444 A | 2/1986 | McEvoy et al. | |
| 5,096,041 A | 3/1992 | van Ravenhorst | |
| 5,365,717 A | 11/1994 | McKinlay | |
| 6,009,239 A | 12/1999 | Morita et al. | |
| 6,029,424 A | 2/2000 | McEvoy et al. | |
| 6,099,239 A * | 8/2000 | Klipp | B65G 59/101 414/797.4 |
| 7,150,350 B2 * | 12/2006 | Hsu | B65G 47/06 198/531 |
| 9,033,646 B2 * | 5/2015 | Kokubo | B65H 31/3054 414/796.1 |
| 2011/0305553 A1 * | 12/2011 | Grohmann | B65G 57/308 414/788.9 |
| 2013/0266413 A1 * | 10/2013 | Bergmeier | B65B 23/08 414/788.8 |
| 2014/0144104 A1 * | 5/2014 | Babraj | B65G 59/12 53/442 |
| 2015/0266602 A1 * | 9/2015 | Franceschi | B65B 29/02 414/222.01 |
| 2016/0031573 A1 * | 2/2016 | Davis | B65B 35/36 53/147 |
| 2017/0297840 A1 * | 10/2017 | Capriotti | B65B 43/44 |

* cited by examiner

TRAY STACK DISPENSER

This application is the U.S. National Phase of, and Applicant claims priority from, International Patent Application Number PCT/NL2016/050149 filed 4 Mar. 2016, which claims priority from NL 2014413 filed 6 Mar. 2015, each of which is incorporated herein by reference.

BACKGROUND OF THE INVENTION

The invention relates to a packaging dispensing device and method for dispensing stacks of nested trays to a packing apparatus for packing eggs, fruits, or like delicate articles. In the packing of eggs and fruits it is common to use stackable trays or boxes of moulded paper pulp, or plastic material having formed therein rows of pockets. In the case of eggs, such trays for example come in sizes of 5 rows of 6 pockets (also known as flats), and optionally in sizes of 2 or 3 rows of 6 pockets (also known as boxes or cartons). Occasionally other sizes have been used as well.

Packing has been generally done by apparatuses such as those disclosed in U.S. Pat. No. 3,169,354, U.S. Pat. No. 5,096,041, or U.S. Pat. No. 5,365,717. When such machines are combined with handling, grading, sorting, and/or processing systems, such as disclosed in U.S. Pat. No. 3,928,184, U.S. Pat. No. 4,086,998, U.S. Pat. No. 4,383,613, U.S. Pat. No. 4,569,444, or U.S. Pat. No. 6,029,424, the throughput of packing trays is required at such an elevated rate that feeding individual trays to multiple packing apparatuses has also been automated. Egg trays are supplied to the egg grading and packing industry in nested stacks. During packing the egg trays, flats or boxes, are dispensed individually from the nested stacks and are fed to a conveyor for transport through a packing line to be filled with eggs. Usually the packing line can be converted to packing into different sized trays. To feed individual trays, each packing apparatus along a distribution conveyor of a grading system is usually provided with a denesting unit that can feed individual trays from a stack of nested trays. Such nested stacks can have a height of up to 140 trays to allow economical transport between the manufacturing plant of the trays and the packing plant. The material of the trays, whether it is paper pulp or plastic has a tendency to cling together and resist denesting. This tendency of sticking and clinging together can cause frequent malfunctions in the existing denesting units, such as those disclosed in U.S. Pat. No. 3,341,072, U.S. Pat. No. 3,478,924, U.S. Pat. No. 4,328,908, or U.S. Pat. No. 6,099,239. Another drawback associated with high speed grading and packing systems is that the denesting units need to be under constant surveillance of operating personal to ensure a sufficient supply of trays to avoid interruption of the entire system. Such denester units are manually supplied with stacks of nested trays containing between 80 and 120 individual trays, or other appropriate numbers resulting in manageable sizes of stacks, which somewhat limits their capacity. Moreover the possibility of varying the stack height between rather large boundaries has also resulted in malfunction of the denester units or packing systems. This has been a particular problem when adherence between the individual trays becomes too great as a result of accumulated weight in a particularly high stack of trays.

Accordingly it is an object of the present invention to propose a tray stack dispenser and method for dispensing stacks of nested trays to a denester of a packing unit, which increases the presently limited capacity. In a more general sense it is thus an object of the invention to overcome or reduce at least one of the disadvantages of the prior art, such as unforeseen interruptions of production. It is also an object of the present invention to provide alternative solutions which are less cumbersome in assembly and operation and which moreover can be made relatively inexpensively. Alternatively it is an object of the invention to at least provide a useful alternative.

SUMMARY OF THE INVENTION

To this end the invention provides a packaging dispenser as defined in one or more of the appended claims. More in particular the invention includes packaging dispenser for dispensing stacks of nested trays to a packing device, the packaging dispenser including: a frame; a first conveyor for conveying and supporting a first plurality of stacks of nested trays in a first level; a second conveyor downstream of the first conveyor for receiving stacks of nested trays from the first conveyor; and a vertical chute underneath the second conveyor for dispensing stacks of nested trays to a packing device, wherein the second conveyor comprises a pair of laterally spaced conveyor elements for supporting only lateral edge regions of a stack of nested trays, and wherein the laterally spaced conveyor elements are retractable to allow a stack of nested trays, supported thereon, to be released into the chute. Such a packaging or tray dispenser also determines a predefined and constant stack height for the stacks of nested trays supplied to a packing device, or its denesting unit, which can substantially reduce malfunction.

Where in this description reference is made to "trays", the expression is also intended to include any flats, boxes, or cartons that include rows of pockets, irrespective of the material from which these are made.

Optionally advancing movement of the second conveyor can be arranged to be controlled independently of advancing movement of the first conveyor, which is convenient when delivery to the chute needs to be delayed. Also optionally the frame can comprises height adjustable legs, which enables the packaging dispenser to be adjusted to different heights of existing packaging devices. The first conveyor can optionally be a belt conveyor. Alternatively or additionally each of the laterally spaced conveyor elements can be a narrow belt conveyor. Such narrow belt conveyors are particularly suitable to make outwardly retractable.

The packaging dispenser of the invention can optionally also comprise a tray separator upstream of the chute for loosening individual trays of a stack, while keeping the trays in a stacked and nested arrangement. Such preliminary loosening or separating of nested trays enhances the efficiency of the denesters to the loosened stacks of trays are fed. This also enables a reliable handling of nested trays that have been in storage for a long time. The tray separator optionally comprises opposite pairs of screw spindles that each engage exposed lateral edges of the individual trays with a helix.

The packaging dispenser of the invention can further comprise at least a first pair of laterally spaced opposite ridges for supporting opposite lateral edges of a second plurality of stacks of nested trays in a second level above the first level. Optionally the at least first pair of opposite ridges can be arranged to be retractable for allowing the second plurality of stacks of nested trays, supported thereon, to drop from the second level to the first level. Each of the laterally spaced opposite ridges of the first pair can optionally also be associated with a relevant one of opposite lateral elongate side walls. The first pair of laterally spaced opposite ridges can be made height adjustable to allow for the accommodation of differently sized stacks of nested trays in the first level. A level height of about 650 mm is usually sufficient to accommodate stacks of about 100 trays, but height adjustability further improves the versatility of the packaging dispenser.

It is also possible for the packaging dispenser of the invention to further comprise at least a second pair of laterally spaced opposite ridges for supporting opposite lateral edges of a third plurality of stacks of nested trays in a third level above the second level, and then have the at least second pair of opposite ridges be retractable to allow the third plurality of stacks of nested trays, supported thereon, to drop from the third level to the first level. Optionally then each of the laterally spaced opposite ridges of the second pair can be associated with a relevant one of laterally opposite extension walls, and each of the extension walls can then be positioned on top of an adjacent one of the opposite lateral elongate side walls. The at least first and second pair of ridges can then conveniently be arranged to be retractable one after the other, and thereby first allow the second plurality of stacks of nested trays to drop from the second level to the first level, and thereafter for the third level to drop to the second level, when the first pair of ridges have returned to their supporting position. Similarly the second pair of laterally spaced opposite ridges can again be height adjustable to allow for the accommodation of differently sized stacks of nested trays in the second level.

The entire arrangement of elongate opposite lateral side walls for guiding the first level of stacks, the opposite pairs of screw spindles for separating the stacked layers, the conveyors, and chute can be arranged to be adjustable for different sizes of flats, cartons, and boxes.

According to a further aspect of the invention, in variation to the appended claims, the packaging dispenser for dispensing stacks of nested trays to a packing device, can also include in combination: a frame; a buffer for receiving and supporting at least one stack of nested trays; and a vertical chute underneath the buffer for dispensing stacks of nested trays to a packing device, wherein the buffer comprises a release mechanism for supporting a stack of nested trays, and wherein the release mechanism is arranged to allow a stack of nested trays, supported thereon, to be released into the chute, the buffer further including a tray separator upstream of the chute for loosening individual trays of a stack, while keeping the trays in a stacked and nested arrangement. Such a packaging or tray dispenser does not necessarily need conveying means for advancing stacks of nested trays in a horizontal first level, but can still reduce malfunctions due to sticking and/or clinging together in connection with an increased supply capacity.

Optionally the frame may comprise height adjustable legs, to be adaptable to existing packing devices, which may have different sizes. The tray separator can comprise again opposite pairs of screw spindles.

Optionally the buffer can then be further modified to include a first conveyor for conveying and supporting a first plurality of stacks of nested trays in a first level; and a second conveyor downstream of the first conveyor for receiving stacks of nested trays from the first conveyor. In such an arrangement the second conveyor can also comprise again a pair of laterally spaced conveyor elements for supporting only lateral edge regions of a stack of nested trays, to represent and function as the release mechanism, and wherein the laterally spaced conveyor elements are retractable to allow a stack of nested trays, supported thereon, to be released into the chute. More in particular each of the laterally spaced conveyor elements can again be a narrow belt conveyor. Other features and detail improvements may be commensurate with the remainder of the appended dependent claims.

BRIEF DESCRIPTION OF THE DRAWINGS

Further advantageous aspects of the invention will become clear from the appended description and in reference to the accompanying drawings, in which.

DETAILED DESCRIPTION

Figure 1:
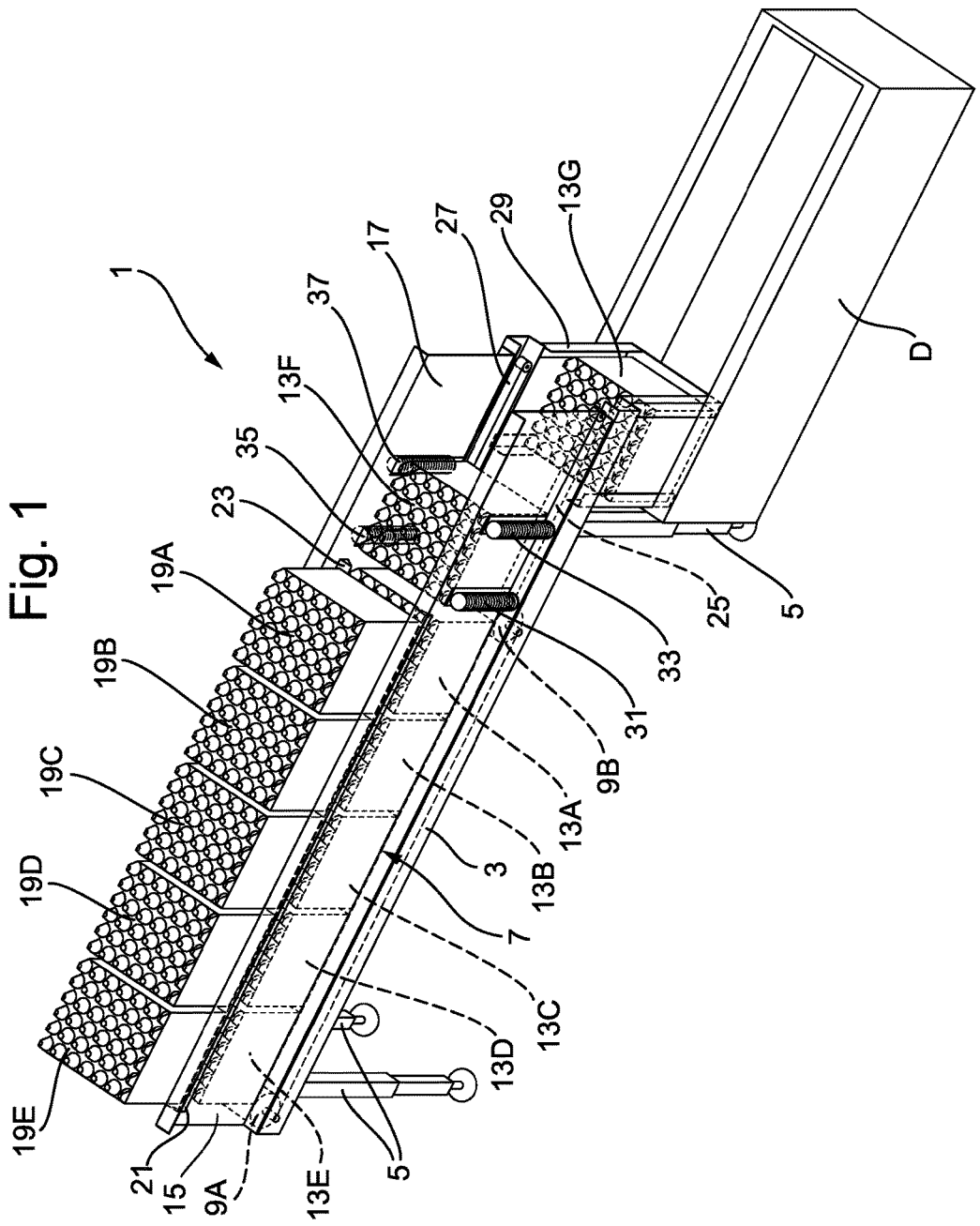
FIG. 1 is a perspective view of a tray stack dispenser in accordance with the invention in a first position of operation.
Figure 2:
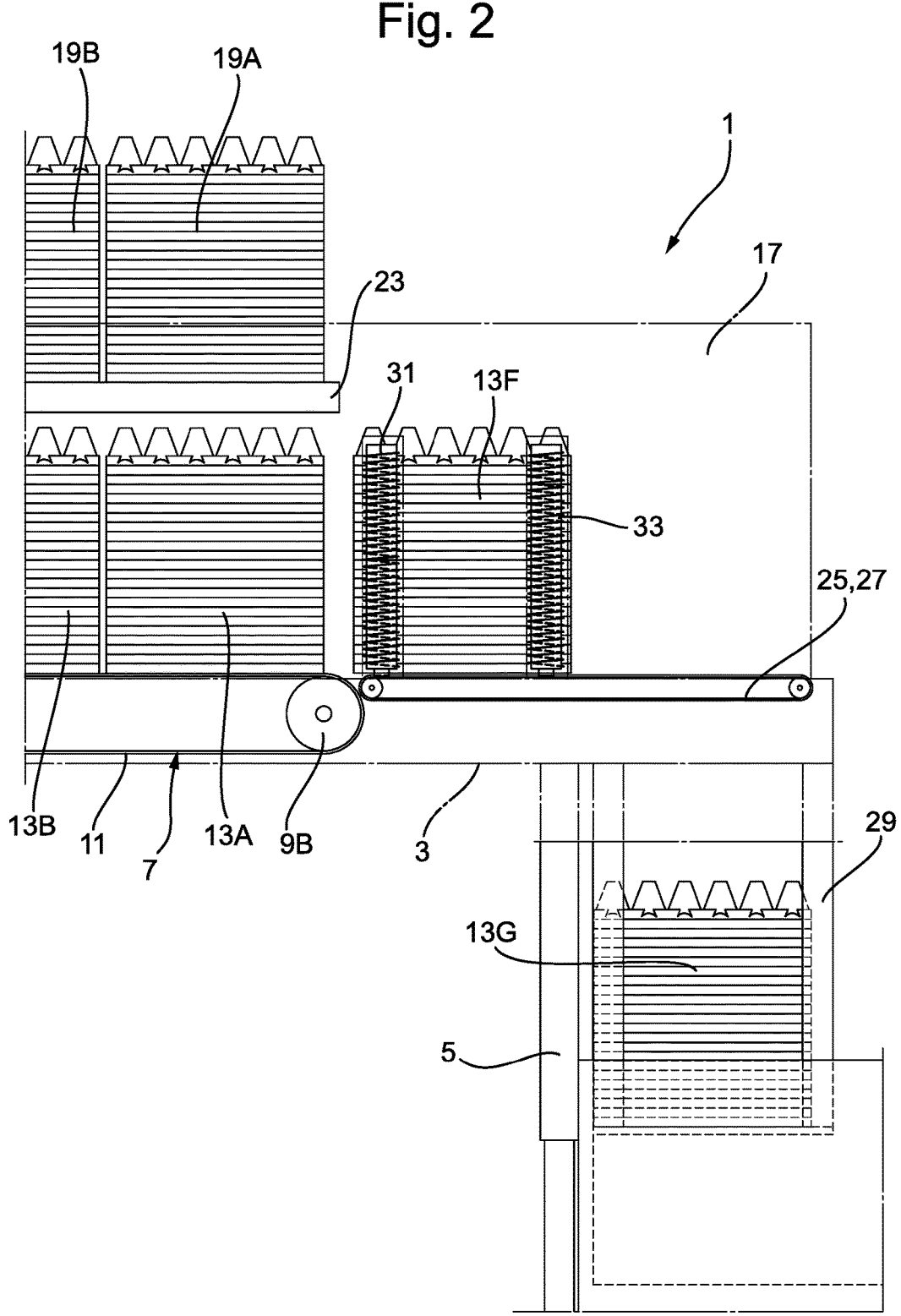
FIG. 2 is a partial side elevation showing a detail in longitudinal cross section of the stack dispenser of FIG. 1 in the first position of operation.
Figure 5:
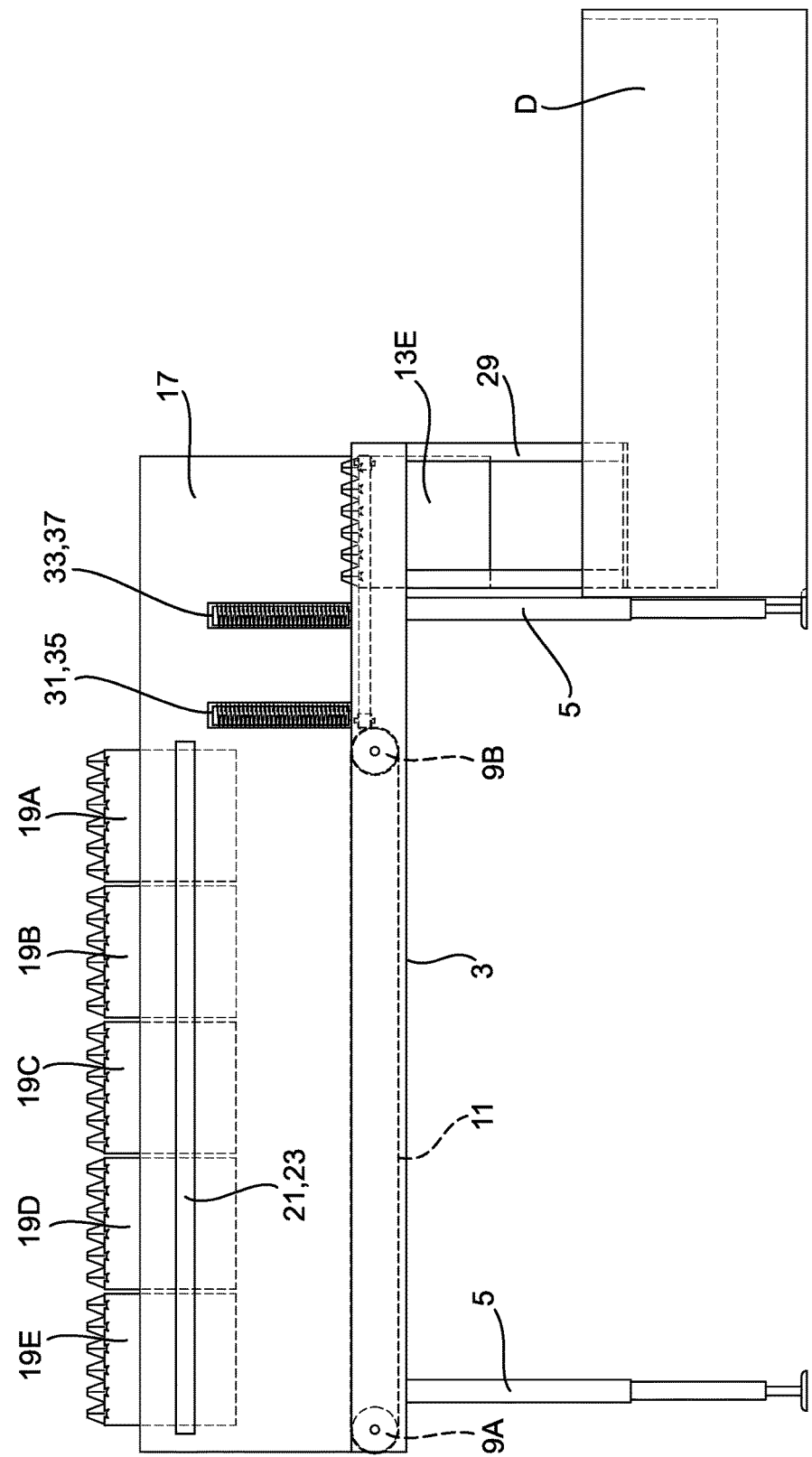
FIG. 5 is a side elevation of the stack dispenser of FIG. 1, in the second position of operation.

In FIG. 1 a tray stack dispenser 1 is shown, which is illustrated in a position for cooperating with a denesting and feeding unit D of an existing egg grading and packing system. The denesting and feeding unit D is not pat of the present invention and is merely shown in a schematic form. The tray stack dispenser 1 has a frame 3 which rests on legs 5. The legs 5 are adjustable for height, to enable adaptation to different denesting units D, as may be associated with various different egg grading and/or packing systems presently in use. The legs 5 may further be provided with castor wheels (not shown, but conventional) at their lower ends to enable the stack dispenser 1 to be moved easily in and out of engagement with a denester unit D. In this regard the height adjustability of the legs 5 is a further advantage in the adaptability. The frame 3 carries a first conveyor 7, which as also shown in FIGS. 2 and 5, includes upstream and downstream rollers 9A, 9B, and an endless belt 11. On a top run of the first conveyor belt 11 is supported a first level of successive stacks 13A-E of nested egg trays. The successive stacks 13A-E of the first level are positioned between opposite longitudinal side walls 15, 17. Also supported between the opposite side walls 15, 17, is a second level of successive stacks 19A-E of nested egg trays. The second level of successive stacks 19A-E is supported on retractable ridges 21, 23 associated with a respective one of the opposite side walls 15, 17. The level at which the ridges 21, 23 are positioned will determine a predefined stack height. Thereby the level at which the ridges 21, 23 are positioned can be constructively fixed, but may also be made adjustable. Downsteam of the first and second levels of successive stacks 13A-E, 19A-E the tray stack dispenser 1 is provided with a second conveyor in the form of a pair of opposite retractable narrow conveyor belts 25, 27. This second conveyor 25, 27 is arranged to carry a stack of nested egg trays, such as 13F and 13G from the first conveyor 7 towards a chute 29 for delivery to a denesting unit D of a known packing station of an egg grading machine that is not part of the present invention. Before being transferred to the chute 29, each stack of nested trays, such as stack of trays 13F in the present example, is fed past a tray separator, or predenester, comprising opposite pairs of screw spindles 31, 33, 35, 37. The screw spindles 31, 33, 35, 37, with helixes thereof in contact with individual tray edges, are each brought into rotation to loosen the adherence of the stacked trays, while retaining the general integrety of the stack.

Figure 3:
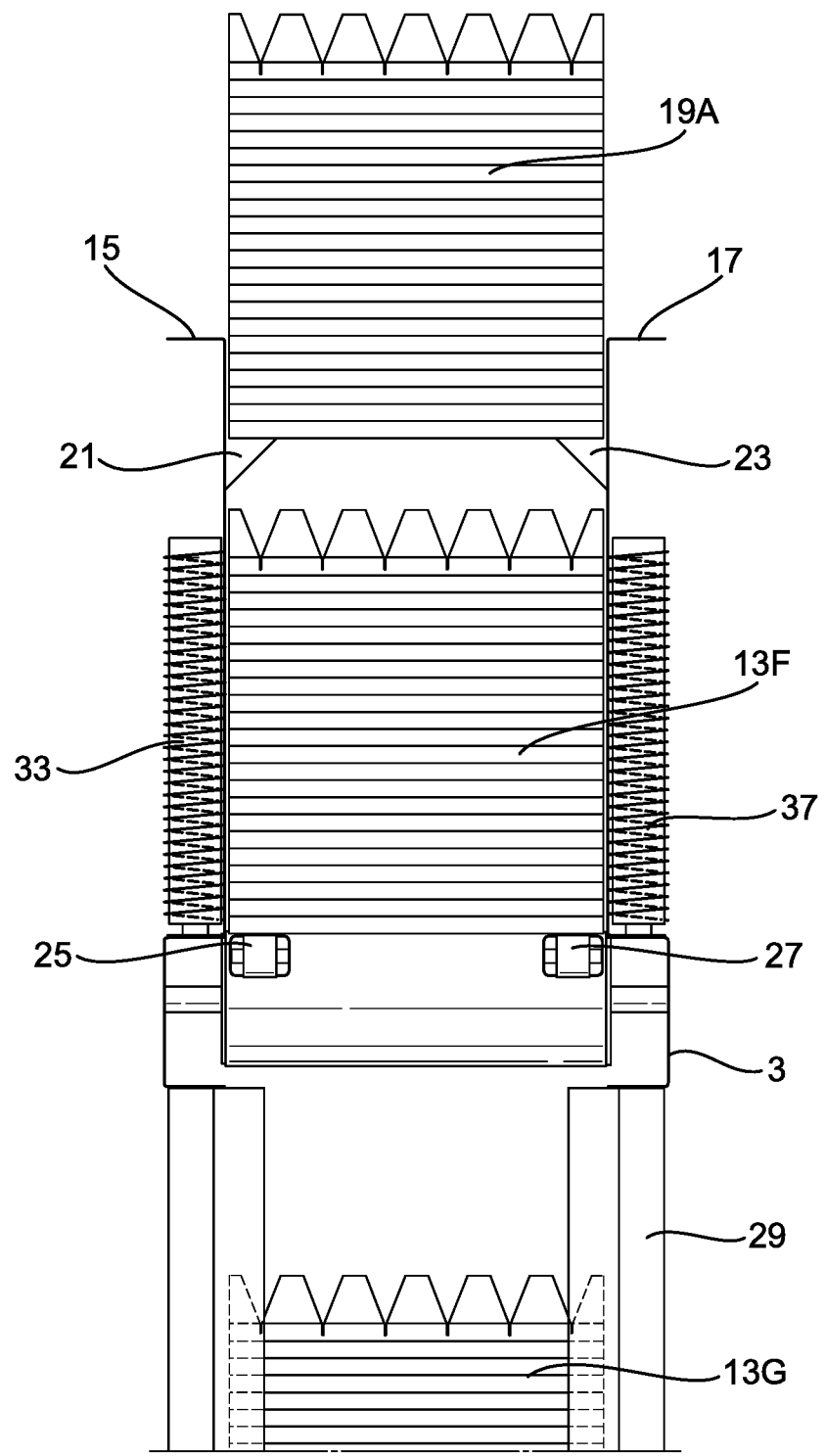
FIG. 3 is a partial end elevation of the stack dispenser of FIG. 1 showing the first position of operation.
Figure 4:
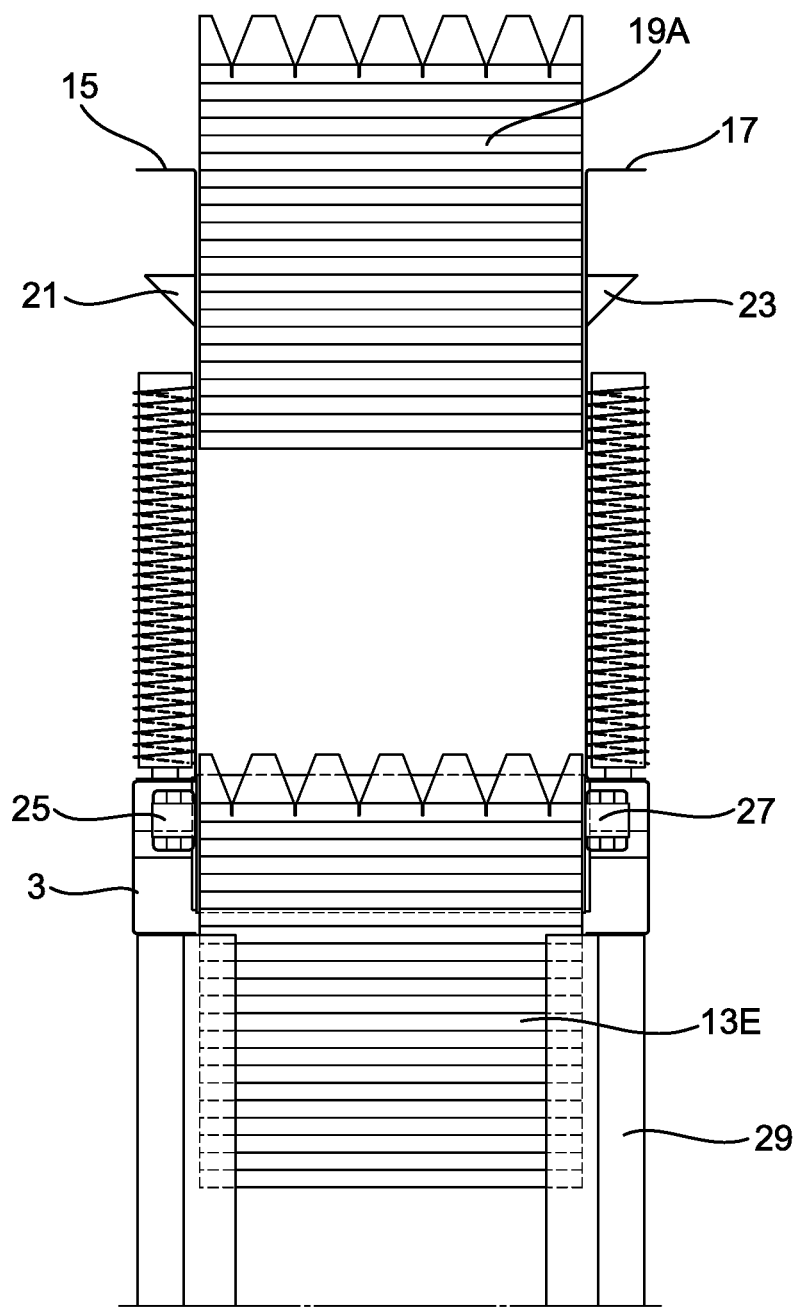
FIG. 4 is a partial end elevation similar to FIG. 3, but showing a second position of operation.

The direction of rotation and the helix of the screw spindles 31, 33, 35, 37 are arranged to lift and separate the perimeter edges of the individual trays in the stack 13 F. Furthermore the screw spindles 31, 33, 35, 37 are positioned to have their helixes interfere with the perimeter edged of the individual trays of stack 13F. After loosening the individual trays in stack 13F sufficiently, the second conveyor 25, 27 is operated to move the stack 13F from between the screw spindles 31, 33, 35, 37 to a position above the chute 29. When in position above the chute 29 the opposite conveyor belts 25, 27 of the second conveyor can be retracked laterally outwardly as shown in FIG. 4 to allow the stack 13F to enter the chute 29 when the previous stack of trays 13G has been removed by the denesting unit D. Referring now to the end elevations of FIGS. 3 and 4 it will be clear that the narrow opposite second belt conveyor 25, 27 can move laterally aside to allow any of the stacks of trays 13A-13G to enter the chute 29. As best seen in FIG. 2 the stack of trays 13F may be held by the screw spindles 31, 33, 35, 37, when the previous stack 13G is released into the chute 29. Alternatively other means, such as suitable guides or a further conveyer, may also be provided to support the stack 13F, while the conveyor belts 25, 27 release the stack 13G for delivery to the chute 29. It is clear that release of a stack to the chute 29 should not interfere with the stack that is still in the tray separator or predenester.

As shown in FIGS. 4 and 5, when the last stack of trays 13E of the first level has entered the chute 29 by lateral retraction of the second conveyor belts 25, 27, the first level of stacked trays has emptied. To ensure uninterrupted continuation of stack dispensing, the retractable ridges 21, 23 flip over to the position shown in FIG. 4 to allow the second level of successive stacks 19A-E to drop to the first level on top of the belt 11 of the first conveyor 7.

Once the stacks 19A-E of the second level are in position in the first level the retractable ridges 21, 23 return to their initial position, and operating personnel can then manually arrange a new second level of successive stacks on top of the retractable ridges 21, 23. The time necessary for the automated process to deplete the first level of stacks (13A-E) is more than sufficient to allow a second level of stacks (19A-E) to be manually placed in position.

To enable the stack dispenser 1 to cope with different sizes of trays, the transverse spacing between the opposite side walls 15, 17, and the opposite screw spindle pairs 31, 35; 33, 37 may be arranged to be adjustable. It will be clear to the skilled person that such adjustability can be obtained by arranging for only one of the opposite side walls 15, 17 and/or only one screw spindle of each opposite pair the be adjustable. For the screw spindles 31, 33, 35, 37 it is not necessary to be adjustable in the longitudinal direction of the stack dispenser 1, when these are fixedly positioned at a predefined spacing that is commensurate with the smallest tray size to be dispensed.

As shown in particular in FIGS. 1 and 5, the tray stack dispenser 1 is shown in a position in which it extends beyond the length of the denesting unit D, with which it is associated. As this increases the footprint of the denesting unit D, it may not always be desirable to arrange the tray stack dispenser 1 in this manner. In those cases where space constraints would be imposed, it is also possible to arrange the frame 3 of the tray stack dispenser 1 to extend above the denesting unit D, and/or a packing conveyor associated therewith. As will be apparent from FIGS. 1 and 5, such repositioning of the tray stack dispenser 1 may be simply achieved by reversing it with respect to the denesting unit D, so that the frame 3 extends over the denesting unit D. Such versatility may be further enhanced when the legs 5 are provided with castor wheels and/or be adjustable in height, as explained above.

Figure 6:
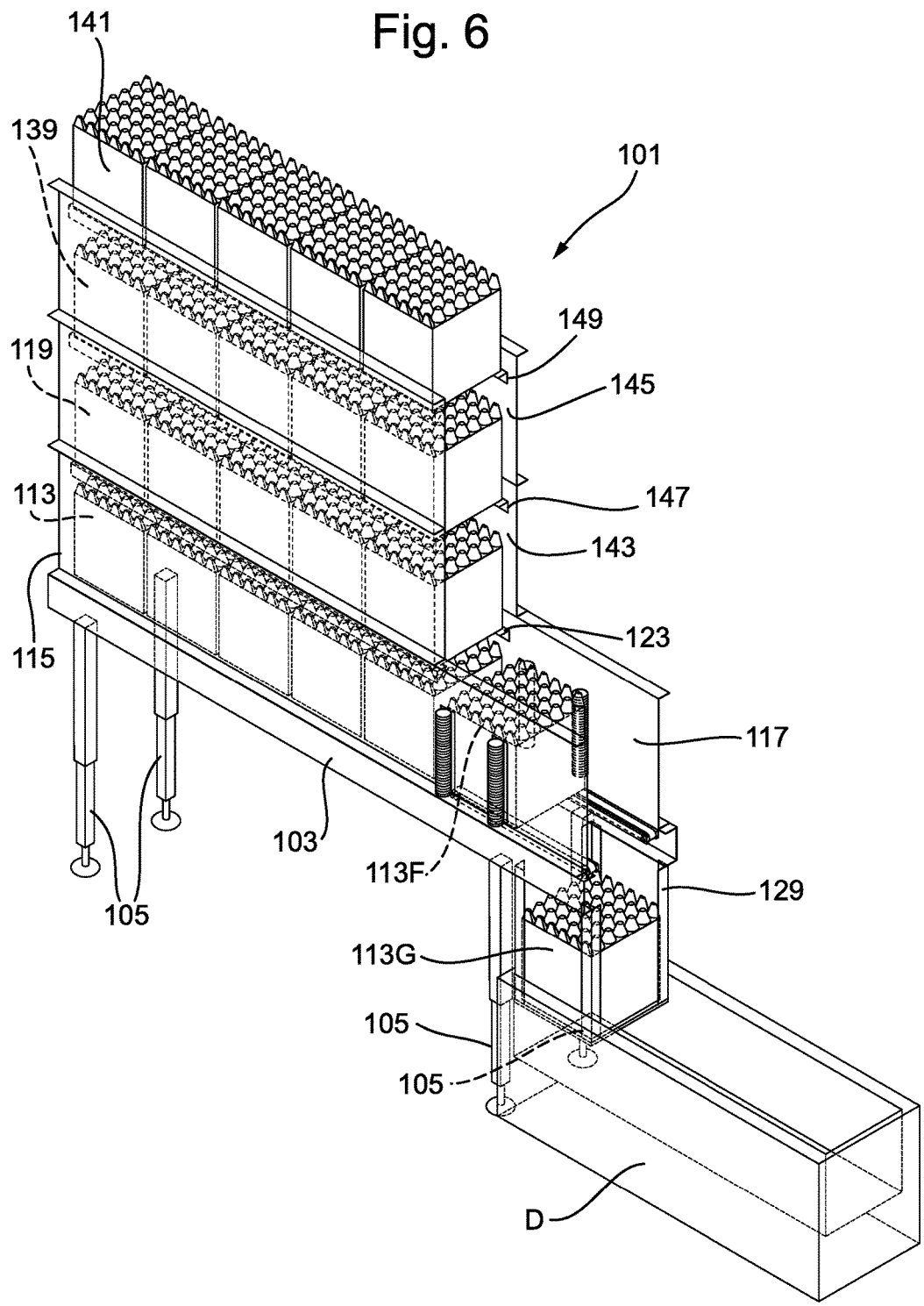
FIG. 6 is a perspective view showing another example of the invention.

By way of example another embodiment of the invention is shown in FIG. 6. The same elements as already identified in the description of FIGS. 1 to 5, are now identified by the same reference numerals, but increased by a full "100". In the stack dispenser 101 of FIG. 6, the opposite longitudinal side walls 115, 117 each have upward extension walls 143, 145 to create a third level 139 of stacked trays and a fourth level of stacked trays 141. Each of the third and fourth levels 139, 141 has its own set of opposite retractable ridges 147, 149 respectively. In this arrangement when the first level of stacks 113 is emptied all of the upper second, third and fourth levels 119, 139, 141 will drop down one level, so that the upper level becomes available for replenishment. Thereby an increased buffer storage of stacked trays becomes available, which can be replenished even at less frequent intervals by the operating personal. Such an increased buffer storage in particular can be advantageous in combination with high-speed grading and packing lines that are capable of handling over 200,000 eggs per hour. Such grading and packing lines may have up to fourteen and sixteen packing units that need to be frequently supplied with new stacks of nested trays. The tray stack dispenser according to the invention, when one thereof is associated with each packing unit, will allow a significant reduction of operating personal. As explained in reference to FIGS. 1 to 5, it would similarly be possible to reverse the position of the stack dispenser 101, as shown in FIG. 6, in a way that it extends above the denesting unit D, rather than lengthwise beyond it. Also similarly the legs 105 can be provided with castor wheels, to enhance the mobility of stack dispenser 101.

Accordingly a packaging dispenser 1; 101, for dispensing stacks of nested trays 13A-G; 113A-G to a packing device D, is described that has a frame 3; 103, a first conveyor 7 for conveying and supporting a first plurality of stacks of nested trays 13A-E; 113A-E in a first level, and a second conveyor 25, 27 downstream of the first conveyor 7 for receiving stacks of nested trays 13F, 13G; 113F, 113G from the first conveyor 7. The packaging dispenser 1; 101 also includes a vertical chute 29; 129 underneath the second conveyor 25, 27 for dispensing stacks of nested trays 13G; 113G to a packing device D. The second conveyor 25, 27 has a pair of laterally spaced conveyor elements for supporting only lateral edge regions of a stack of nested trays 13F; 113F. The laterally spaced conveyor elements 25, 27 are retractable to allow a stack of nested trays 13F, 13G; 113F, 113G, supported thereon, to be released into the chute 29; 129. The packaging dispenser 1; 101 can further be provided with a tray separator 31, 33, 35, 37 upstream of the chute 29; 129 for loosening individual trays of a stack 13F; 113F, while keeping the trays in a stacked and nested arrangement.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extent that structure, material, or acts are considered to be essential they are inexpressively indicated as such. Additions, deletions, and modifications within the purview of the skilled person may generally be made without departing from the scope of the invention, as determined by the claims.

The invention claimed is:

1. Packaging dispenser for dispensing stacks of nested trays to a packing device, the packaging dispenser including:
   a frame;
   a first conveyor for conveying and supporting a first plurality of stacks of nested trays in a first level;
   a second conveyor downstream of the first conveyor for receiving stacks of nested trays from the first conveyor; and
   a vertical chute underneath the second conveyor for dispensing stacks of nested trays to a packing device,
   wherein the second conveyor comprises a pair of laterally spaced conveyor elements for supporting only lateral edge regions of a stack of nested trays, and wherein the laterally spaced conveyor elements are retractable to allow a stack of nested trays, supported thereon, to be released into the chute.

2. Packaging dispenser as in claim 1, wherein advancing movement of the second conveyor is arranged to be controlled independently of advancing movement of the first conveyor.

3. Packaging dispenser as in claim 1, wherein the frame comprises height adjustable legs.

4. Packaging dispenser as in claim 1, wherein the first conveyor is a belt conveyor.

5. Packaging dispenser as in claim 1, wherein each of the laterally spaced conveyor elements is a narrow belt conveyor.

6. Packaging dispenser as in claim 1, further including a tray separator upstream of the chute for loosening individual trays of a stack, while keeping the trays in a stacked and nested arrangement.

7. Packaging dispenser as in claim 6, wherein the tray separator comprises opposite pairs of screw spindles.

8. Packaging dispenser as in claim 1, further comprising at least a first pair of laterally spaced opposite ridges for supporting opposite lateral edges of a second plurality of stacks of nested trays in a second level above the first level.

9. Packaging dispenser as in claim 8, wherein the at least first pair of opposite ridges are retractable to allow the second plurality of stacks of nested trays, supported thereon, to drop from the second level to the first level.

10. Packaging dispenser as in claim 8, wherein each of the laterally spaced opposite ridges of the first pair is associated with a relevant one of opposite lateral elongate side walls.

11. Packaging dispenser as in claim 8, wherein the first pair of laterally spaced opposite ridges is height adjustable to allow for the accommodation of differently sized stacks of nested trays in the first level.

12. Packaging dispenser as in claim 8, further comprising at least a second pair of laterally spaced opposite ridges for supporting opposite lateral edges of a third plurality of stacks of nested trays in a third level above the second level, and wherein the at least second pair of opposite ridges are retractable to allow the third plurality of stacks of nested trays, supported thereon, to drop from the third level to the first level.

13. Packaging dispenser as in claim 12, wherein each of the laterally spaced opposite ridges of the second pair is associated with a relevant one of laterally opposite extension walls, and wherein each of the extension walls is positioned on top of an adjacent one of the opposite lateral elongate side walls.

14. Packaging dispenser as in claim 12, wherein the at least first and second pair of ridges are arranged to be retractable one after the other, to first allow the second plurality of stacks of nested trays to drop from the second level to the first level, and then for the third level to drop to the second level, after the first pair of ridges have returned to their supporting position.

15. Packaging dispenser as in claim 12, wherein the second pair of laterally spaced opposite ridges is height adjustable to allow for the accommodation of differently sized stacks of nested trays in the second level.

* * * * *